United States Patent [19]
Magnier

[11] 3,741,358
[45] June 26, 1973

[54] SYNCHRONIZERS
[75] Inventor: Roger Magnier, Billancourt, France
[73] Assignees: Regie Nationale Des Ursines Renault, Billancourt; Automobiles Peugeot, Paris, both of France
[22] Filed: Sept. 20, 1971
[21] Appl. No.: 182,086

[30] Foreign Application Priority Data
Sept. 24, 1970 France.................7034617

[52] U.S. Cl............................. 192/53 F
[51] Int. Cl............................ F16d 23/06
[58] Field of Search............. 192/53 E, 53 F, 53 G

[56] References Cited
UNITED STATES PATENTS

| | | | |
|---|---|---|---|
| 2,046,957 | 7/1936 | Manville | 192/53 F |
| 2,221,894 | 11/1940 | White | 192/53 F |
| 2,253,578 | 8/1941 | Peterson et al. | 192/53 E |
| 2,410,511 | 11/1946 | Letsinger et al. | 192/53 F |
| 2,788,874 | 4/1957 | Forster | 192/53 F |
| 3,355,909 | 12/1967 | Russey et al. | 192/53 F X |

Primary Examiner—Allan D. Herrmann
Attorney—Stevens, Davis, Miller & Mosher

[57] ABSTRACT

A device for synchronizing the driving and driven elements of a change-speed transmission mechanism comprising a hub rigid with the driving shaft, an axially movable sliding member forming an outer ring, a synchromesh ring formed with a tapered friction surface which is rotatably rigid with said hub and adapted to be shifted angularly between two abutment surfaces of said hub and to move axially towards the conjugate tapered surface of a driven loose pinion as a consequence of the axial thrust exerted by said sliding member and of intermediate connecting members engaging on the one hand notches formed in said hub and on the other hand a common groove formed in said sliding member, said elements being radially retractable during the synchronization and consisting of balls adapted to be moved in a manner known per se by the sliding member towards an abutment surface formed on said synchromesh ring in a plane perpendicular to the axis of rotation of said ring.

5 Claims, 13 Drawing Figures

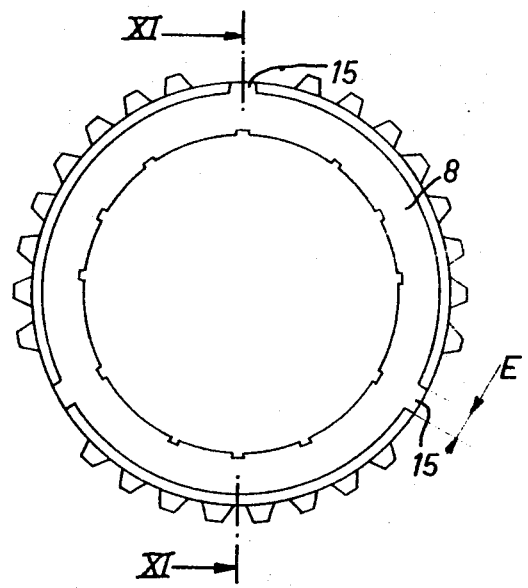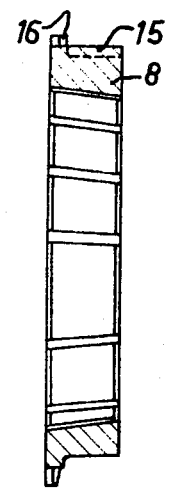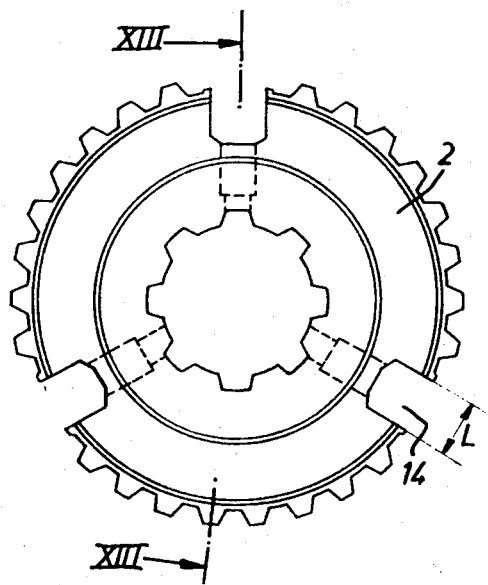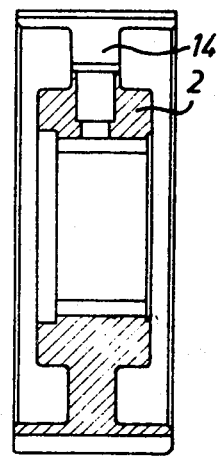

SYNCHRONIZERS

The present invention relates to synchronizers for change-speed transmission mechanisms or gearboxes, that is, a device adapted to bring the rotational speed of the driven shaft or pinion to the rotational speed of the driving shaft or pinion just before the former is driven by the latter.

A standard type of synchronizer of this general character is described in the U.S. Pat. No. 2,221,893; it utilizes a synchromesh ring provided with teeth and urged towards the cone of the pinion to be synchronized by keys actuated by the sliding ring or like member. This sliding ring or like member is guided by the hub rigid with the main shaft, and is slidably moved by translation towards the corresponding pinion to be synchronized which revolves freely on the shaft.

As a rule, when changing from one gear to another, the sliding ring and the pinion to be synchronized have different rotational velocities. For instance, the sliding member revolves faster than the pinion to be synchronized and the synchromesh ring receives in its rectangular notches formed on the face registering with keys actuated by the sliding member the rectangular ends of these keys. The play provided between the side faces of said notches and keys permits the shifting of the sliding member teeth in relation to the synchromesh ring teeth to prevent the translation of the sliding member towards the dog or loose pinion until the synchronization is completed. These keys are urged radially away by springs and each key is adapted to travel longitudinally in a slot of said hub.

During the synchronization proper these keys are retracted radially towards the center to permit the axial movement of the sliding member.

Since these keys are retracted only as a consequence of the effort of translation exerted on the sliding member, it is essential that the resistance due to the frictional forces counteracting the movement of these keys be as low as possible. On the other hand it is known that the greater the force of the key urging springs, the higher the synchronizing torque.

In actual practice, it is observed that the radial movement of the keys as they recede towards the center is retarded by their frictional contact with the synchromesh ring and the hub. The magnitude of the resistance resulting from the frictional contact between these keys and the synchromesh ring and the hub is subordinate to the torque caused by the frictional contact between the tapered surfaces involved. It may be remarked that this torque may also vary as a function of the tendency of the keys to move away from their oblique surfaces of engagement with the sliding member. Since in practice the thrust transmitted by the keys should be sufficient to set or cock the synchromesh ring, the radial movements of the keys is retarded during the axial translation of the sliding member towards the ring teeth, as a function of the springs selected for moving the keys away from the axis of the device. The stronger these springs, the better the synchronizer cocking.

It is the essential object of the present invention to provide a synchronizer capable of eliminating the braking of the sliding member during the movements of said keys under load, whereby a hard point is eliminated in the control of the change-speed or gearbox mechanism.

A typical form of embodiment of this synchronzer comprises a hub secured to the driving shaft of a transmission mechanism, a sliding sleeve, a synchromesh ring having a tapered friction surface and rotatably rigid with said hub, said ring being adapted to be shifted angularly in relation to said hub and to move axially towards a conjugate tapered friction surface formed on a member rigid with the loose pinion to be synchronized, under the axial thrust of the sliding member and through the medium of connecting elements disposed in notches formed in said hub, said connecting elements being radially retractable towards the center under the thrust of the sliding member provided with a groove, against an antagonistic effort directed towards said sliding member. Said device is characterized in that said connecting elements consist of balls adapted to be moved in a known fashion by said sliding member towards an abutment surface formed on said synchromesh ring in a plane perpendicular to the axis of rotation of said ring.

These connecting and driving elements, according to the present invention, are characterized by a particular simplicity and permit an easy, compact construction of the complete synchromesh device. thus, the axial dimensions of the component elements of this device are reduced appreciably, and the resulting reduction in length of the transmission mechanism comprising as a rule a plurality of gear trains and synchronizers is particularly advantageous for obvious reasons.

According to a specific form of embodiment of the synchromesh device of this invention, the aforesaid balls are constantly resiliently urged in the radial direction into the inner groove of the sliding member by compression springs.

According to a more economical form of embodiment of the device of this invention, said balls are urged into said inner groove of the sliding member by centrifugal force alone during the rotation of the transmission component elements. This last-mentioned arrangement facilitates greatly the gear changes when the vehicle is stationary, so that the engagement of the various gears takes place with a considerable smoothness.

It will also be seen that the synchromesh ring has a simplified configuration and a rigidity particularly adapted for its manufacture according to the sintered-metal industrial process.

Other features and advantages of this invention will appear as the following description proceeds with reference to the accompanying drawing illustrating diagrammatically by way of example a typical form of embodiment of the invention. In the drawings :

FIG. 10 is a front elevational view of the synchromesh ring ;

FIG. 11 is a section taken along the line XI—XI of FIG. 10 ;

FIG. 12 is a front elevational view of the hub ; and

FIG. 13 is a section taken along the line XIII—XIII of FIG. 12.

Figure 1:
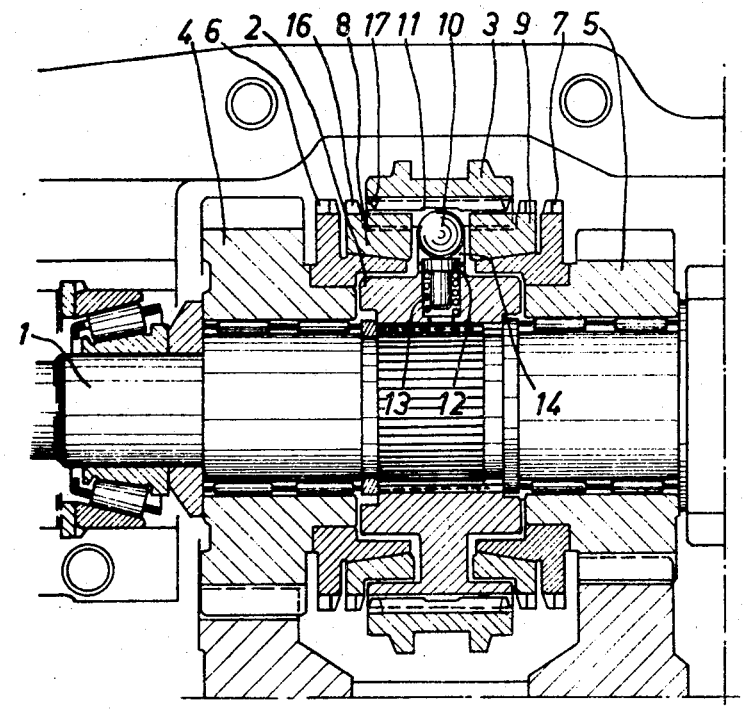
FIG. 1 is a longitudinal axial section of the device.

Referring first to FIG. 1, a twin synchromesh device is illustrated therein; this device is mounted on the input shaft of the change-speed mechanism or gearbox, between two pinions adapted to revolve freely on said shaft and to be caused selectively to rotate at the same speed (synchronization) as a driving input shaft.

The input shaft is denoted 1, the synchronizer hub 2 is rigid with this shaft 1, the sliding member 3 (engageable by a control fork, not shown) is mounted through splines on the hub 2, and the loosely rotating pinions 4, 5 are rigid with annular members formed with driving dogs 6, 7 and also with tapered surface 6a and 7a adapted to co-act with other, corresponding tapered surfaces 8a, 9a of synchromesh rings 8 and 9, respectively.

A plurality of ball units are provided at spaced intervals in radial holes of the hub 2 and comprise each a coil compression spring 13 urging through the medium of a push member 12 a ball 10 into the bottom of an inner groove 11 formed in the sliding member 3.

At least three balls 10 are provided; these balls 10 are located in corresponding notches 14 formed in the hub 2 (FIGS. 1 and 13) with a small circumferential clearance; the balls 10 can move freely in the longitudinal direction between the registering or back surfaces of synchromesh rings 8, 9, and are adapted selectively to engage an abutment surface of one of said rings which lies in a plane perpendicular to the axis of rotation.

Figure 5:
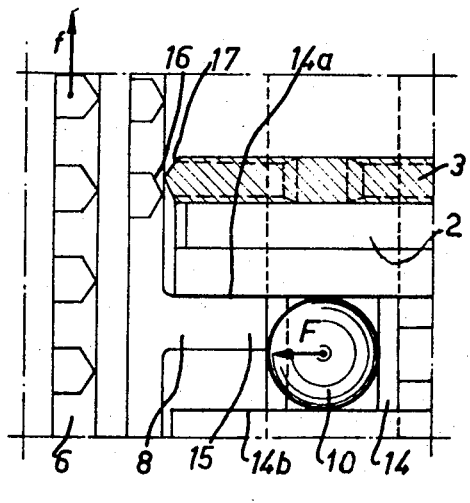

These synchromesh rings are provided on their outer peripheral surface with three spaced longitudinal keys 15 of a thickness E calculated as a function of the width L of the notches 14 of hub 2, as already known per se. Thus, the leading ends of the peripheral teeth 16 formed on these rings will register with the inlet end of the spaces between the teeth 17 of the sliding member 3 when the circumferential play of the relevant ring is reduced to zero in one or the other direction of rotation as a consequence of the abutment of the keys 15 of said ring against one of the registering faces of the notches 14 formed in the hub (FIG. 5).

The synchromesh device according to this invention operates as follows :

Neutral position

Figure 2:
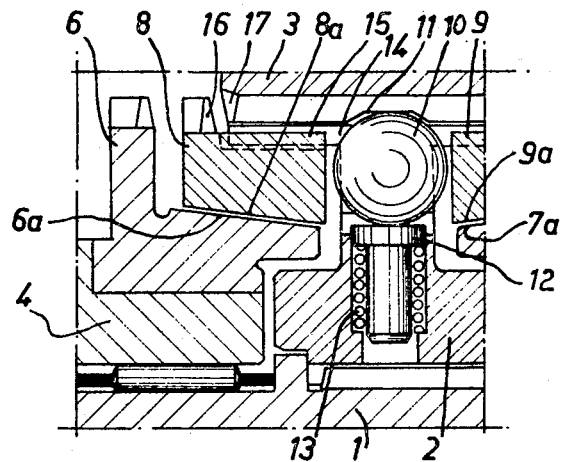
FIGS. 2, 4, 6 and 8 are fragmentary sectional views illustrating successive steps of the operation of this device.
Figure 3:
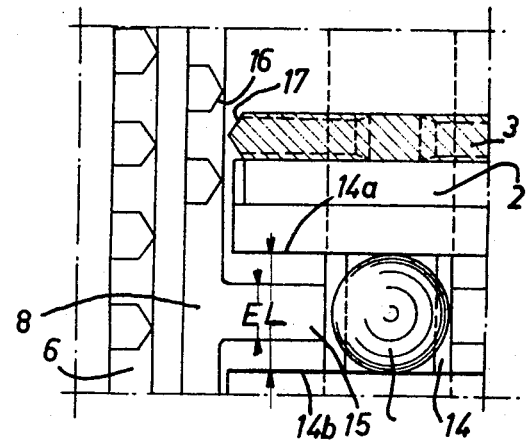
FIGS. 3, 5, 7 and 9 are fragmentary external views corresponding to FIGS. 2, 4, 6 and 8, respectively.

A seen in FIG. 2, the balls 10 are urged radially outwards by springs 13 through push members 12; alternately, during the vehicle operation, these balls 10 may be so urged simply by the centrifugal force; in either case, they engage the groove 11 of sliding member 3 and lie freely with play between the back surfaces of the pair of opposite synchromesh rings 8 and 9. The tapered surfaces 8a and 9a of these rings are not in contact with the synchronizing tapered surfaces 6a and 7a of dog members 6 and 7.

Cocking

Figure 4:
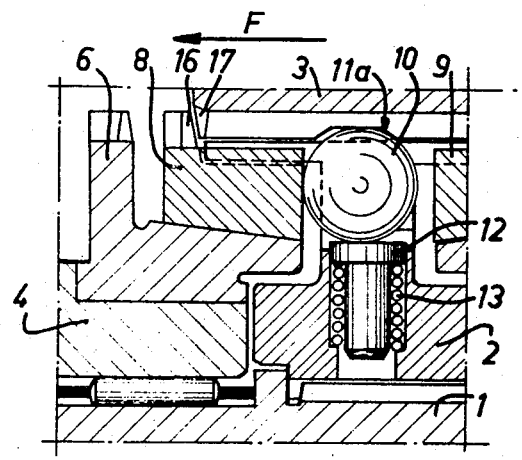

As shown in FIG. 4, if the driver of the vehicle (or the operator of the change-speed mechanism) is desirous of angularly interconnecting the shaft 1 and loose pinion 4, he shifts in the known fashion the sliding member 3 in the direction of the arrow F. The lateral ramp 11a of groove 11 of sliding member 3 forces the balls towards the back surface of ring 8, the tapered surface 8a of this ring being stopped by its engagement with the tapered surface 6a of the dog member 6 of pinion 4.

The speed differential between ring 8 (drivingly connected to shaft 1 via its keys 15 engaging the notches 14 of hub 2) and annular dog member 6 rigid with pinion 4 causes an angular shift of ring 8 such that said keys 15 abut against the faces 14a of notches 14 of hub 2, according to the direction of rotation of said shaft in relation to said pinion 4 to be coupled this direction being designated by the arrow f, in this example, in connection with dog member 6 (FIG. 5).

Thus, the inlets 16 of the teeth formed on synchromesh ring 8 and the inlets 17 of the teeth of sliding member 3 register with one another in the positions shown in FIG. 5.

The "cocking" step is obtained; in other words, the sliding member 3 cannot subsequently move towards the loose pinion without causing its teeth inlets to abut against the teeth inlets of the synchromesh ring. These teeth inlets are formed with the same slope, in the manner known per se (FIG. 5).

End of cocking

Figures 6, 8:
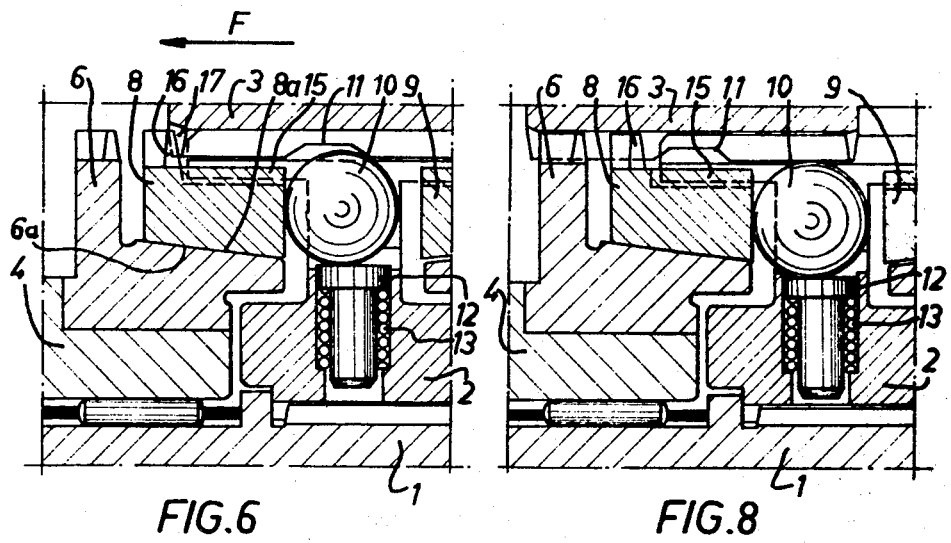
Figures 7, 9:
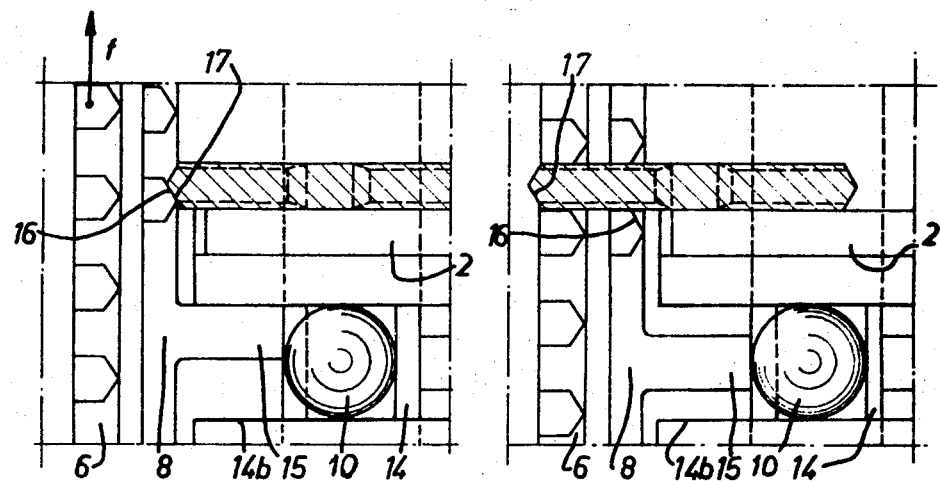

As illustrated in FIGS. 6 and 7, the sliding member 3 continuing its movement towards the pinion 4 causes with its ramp 11a the balls 10 to recede towards the axis of the device, when the co-operating tapered surfaces 8a and 6a of ring 8 and dog member 6 are fully engaged with each other.

The ring 8 is urged against the tapered surface 6a by a force depending on the resistance of balls 10 of this inward movement. Then the sliding member 3 is stopped during its axial movement by the mutual engagement of the teeth inlets 16 and 17, as shown in FIG. 7.

As in any conventional synchronizer comprising a safety feature the sliding member 3 cannot continue its movement towards pinion 4 as long as the ring 8 and pinion 4 are not revolving at the same speed.

The technical improvement provided by this invention lies notably in this final phase of the cocking action. Cold operation at low speed with high reduction ratios, and geometrical defects in some component elements of the mechanism make it frequently necessary, for cooking the ring, to obtain a firm mutual engagement between the tapered surfaces 6a and 8a, immediately as they contact each other, this condition producing a friction strong enough to assist immediately in causing the synchronization proper between the tapered surfaces thus brought into mutual engagement.

In the arrangement illustrated and described herein the effort necessary for moving the sliding member 3 is independent of the friction torque induced at this time by the mutually engaging tapered surfaces for the movement of the balls 10 towards the axis of the device will be checked by the springs 13 through the push members 12 (or by the centrifugal force, if these members are dispensed with), without any superposition of stray frictional efforts. Thus, the ball movement will require considerably less effort than the movement (with frictional contact) of the key arrangement utilized up to now, and will not give rise to any "hard point" or any feeling or "catching" during the actuation of the gear control member.

It may be noted that the springs and push members are necessary only in case the rotational speeds obtained are not sufficient to cause the resulting centrifugal force to safely urge the balls towards the bottom of the internal groove of the sliding member. In any case, these springs and push members can safely be dispensed with in low gear synchronizers.

Synchronization

The complete synchronization is obtained in the known fashion. The slope of the bearing surfaces formed at the inlet ends of the teeth (16, 17) is such that any frictional torque induced by the mutual engagement of the tapered surfaces 6a, 8a is attended by an axial effort exerted on the sliding member which counteracts the force for moving this member towards the corresponding pinion, said axial effort being greater than the force applied to the sliding member. Thus, the movement of the sliding member towards the loosely rotating pinion is prevented until the ring 8 and pinion 4 revolve at the same speed. The ring 8 is held against rotation by the engagement of keys 15 against the side faces of notches 14, in a manner also known per se.

Coupling

As illustrated in FIGS. 8 and 9, when this synchronzation is obtained the synchronizer is relased in a known manner by angularly shifting the synchromesh ring 8 in the direction opposite to that of arrow f, and the sliding member 3 can complete its travel without difficulty to produce the driving engagement of its splines with the dogs of member 6.

Although a single and specific form of embodiment of this invention has been described and illustrated herein, it will readily occur to those conversant with the art that many modifications and variations may be brought thereto without departing from the scope of the invention as set forth in the appended claims.

What is claimed is:

1. Device for synchronizing the driving and driven elements of a change-speed transmission mechanism, which comprises a hub solid with the driving shaft, a sliding member movable axially on said hub, a snychromesh ring provided with a tapered friction surface and rotatably solid with said hub, adapted to be shifted angularly between two abutment surfaces of said hub and to move axially towards the conjugate tapered surface of a driven loose pinion under the influence of the axial thrust exerted on said sliding member and of intermediate connecting elements disposed in notches formed in said hub, said elements engaging a groove of said sliding member and being adapted to recede radially during the synchronization as a consequence of the thrust exerted by said sliding member against an antagonistic effort directed radially against said sliding member, wherein said connecting elements comprise balls which are moved axially by the sliding member towards an abutment surface formed on the synchromesh ring in a plane substantially perpendicular to the axis of rotation of said ring.

2. Synchronization device according to claim 1, wherein the balls are urged towards the bottom of the groove of said sliding member by a spring force.

3. Synchronization device according to claim 2 wherein said balls are disposed between two parallel abutment surfaces formed on the registering back surfaces of synchromesh rings of a synchronizer comprising two loose pinions rotatably mounted about a common axis.

4. Synchronization device according to claim 1 wherein the balls are urged towards the bottom of the grooves of said sliding member by centrifugal force.

5. Synchronization device according to claim 1 wherein the balls are urged towards the bottom of the groove of said sliding member by a spring and centrifugal force.

* * * * *